(12) United States Patent
Harper et al.

(10) Patent No.: US 7,866,939 B2
(45) Date of Patent: Jan. 11, 2011

(54) LINER FOR A GAS TURBINE ENGINE CASING

(75) Inventors: Cedric B Harper, Derby (GB); Michael Creagh, Stillorgan (IE); Neil Humphries, Derby (GB); Ian G Martindale, Derby (GB)

(73) Assignee: Rolls-Royce plc, London (GB)

( * ) Notice: Subject to any disclaimer, the term of this patent is extended or adjusted under 35 U.S.C. 154(b) by 1853 days.

(21) Appl. No.: 10/964,715

(22) Filed: Oct. 15, 2004

(65) Prior Publication Data

US 2009/0324390 A1    Dec. 31, 2009

(30) Foreign Application Priority Data

Oct. 22, 2003  (GB) ................................. 0324549.5

(51) Int. Cl.
*F01D 25/24* (2006.01)
(52) U.S. Cl. .......................... 415/9; 415/119; 415/213.1
(58) Field of Classification Search ..................... 415/9, 415/119, 213.1, 220
See application file for complete search history.

(56) References Cited

U.S. PATENT DOCUMENTS

| | | | | |
|---|---|---|---|---|
| 3,481,427 A | * | 12/1969 | Dobbs et al. ................. | 181/292 |
| 3,821,999 A | * | 7/1974 | Guess et al. ................. | 181/296 |
| 3,948,346 A | * | 4/1976 | Schindler .................... | 181/286 |
| 4,149,824 A | * | 4/1979 | Adamson ....................... | 415/9 |
| 4,344,995 A | * | 8/1982 | Hammer ....................... | 428/61 |
| 4,384,634 A | | 5/1983 | Shuttleworth | |
| 4,867,639 A | * | 9/1989 | Strangman ............... | 415/173.4 |
| 5,201,846 A | * | 4/1993 | Sweeney ................. | 415/173.6 |
| 5,823,739 A | * | 10/1998 | Van Duyn ....................... | 415/9 |
| 5,885,056 A | * | 3/1999 | Goodwin ....................... | 415/9 |
| 6,120,242 A | * | 9/2000 | Bonnoitt et al. ................ | 415/9 |
| 6,371,721 B1 | * | 4/2002 | Sathianathan et al. .......... | 415/9 |
| 6,468,026 B1 | * | 10/2002 | Bonnoitt et al. ................ | 415/9 |
| 6,543,991 B2 | * | 4/2003 | Sathianathan et al. .......... | 415/9 |
| 6,769,864 B2 | * | 8/2004 | Sathianathan et al. .......... | 415/9 |
| 2002/0141859 A1 | * | 10/2002 | Sathianathan et al. .......... | 415/9 |
| 2002/0164244 A1 | * | 11/2002 | Sathianathan et al. .......... | 415/9 |
| 2009/0321178 A1 | * | 12/2009 | Durchholz et al. .......... | 181/141 |

FOREIGN PATENT DOCUMENTS

| | | |
|---|---|---|
| GB | 2 319 589 A | 5/1998 |
| GB | 2 382 380 A | 5/2003 |

* cited by examiner

*Primary Examiner*—Edward Look
*Assistant Examiner*—Aaron R Eastman
(74) *Attorney, Agent, or Firm*—Jeffrey S. Melcher; Manelli Denison & Selter PLLC

(57) ABSTRACT

A turbofan gas turbine engine (10) comprises a fan rotor (32) carrying a plurality of radially extending fan blades (34). A fan blade containment assembly (38) surrounds the fan blades (34) and the fan blade containment assembly (38) comprises a generally cylindrical, or frustoconical, metal casing (40). The casing (40) comprises an annular member (54) positioned axially upstream of the tip (37) of the fan blade (34). The annular member (54) extends in a radially inwardly and axially downstream direction from the metal casing (40) towards the tip (37) of the fan blade. A set of cassettes (120) carries fan blade track panels (71B, 71C, 71D). The cassettes (120) are secured to the metal casing (40) by axially extending members (124, 128) on the upstream and downstream ends (122, 126) of the cassettes (120) which locate on the annular member (54) and are secured to inserts (136) on the inner face of the casing (40).

47 Claims, 3 Drawing Sheets

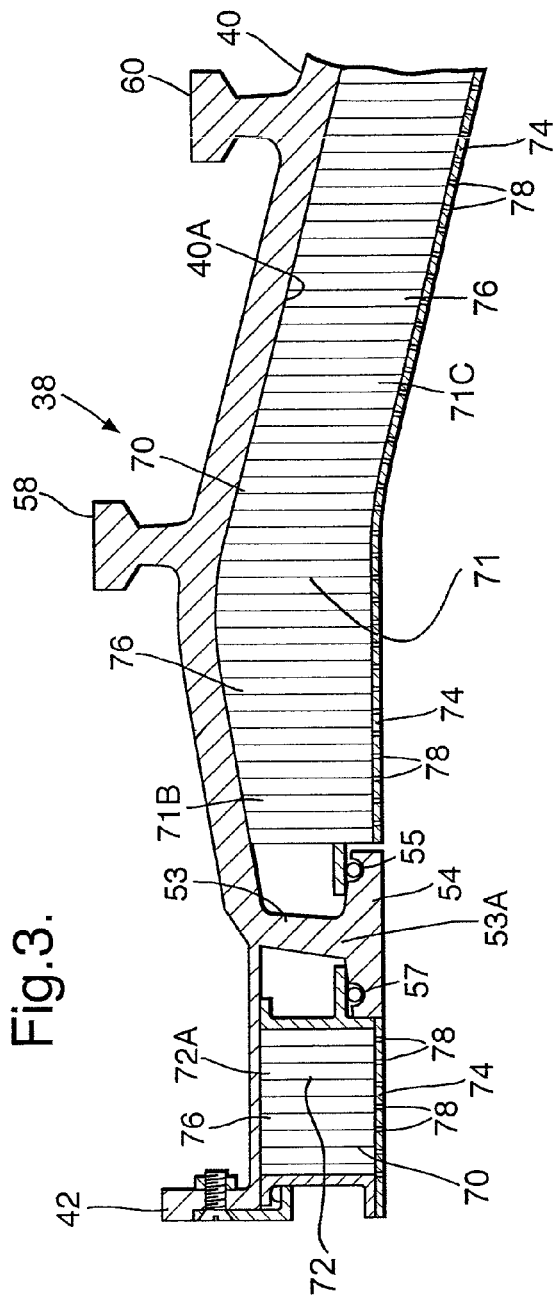
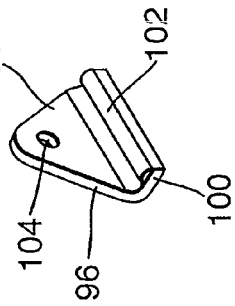
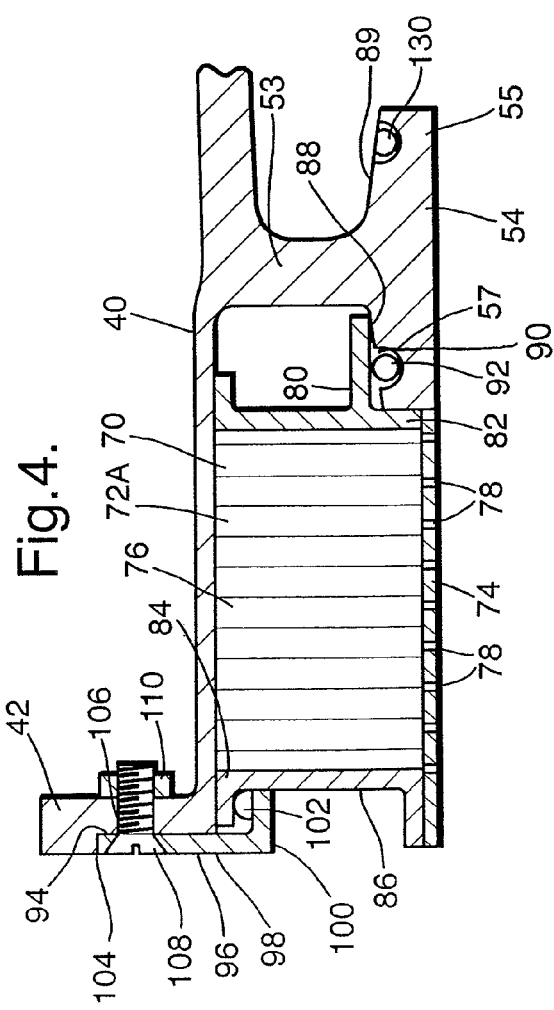

LINER FOR A GAS TURBINE ENGINE CASING

CROSS-REFERENCE TO RELATED APPLICATIONS

This application claims priority to GB 0324549.5, filed 22 Oct. 2003.

BACKGROUND OF THE INVENTION

The present invention relates to gas turbine engine casings, particularly for gas turbine engine fan casings and turbine casings, more particularly to an improved acoustic liner or an improved rotor blade track liner for use within the gas turbine engine casing.

Turbofan gas turbine engines for powering aircraft conventionally comprise a core engine, which drives a fan. The fan comprises a number of radially extending fan blades mounted on a fan rotor enclosed by a generally cylindrical fan casing. The core engine comprises one or more turbines, each one of which comprises a number of radially extending turbine blades enclosed by a cylindrical, or frustoconical, casing.

The fan casing is provided with a hook axially upstream of the tips of the fan blades to prevent upstream movement of a detached fan blade.

There is a requirement to provide an acoustic liner within the fan casing axially upstream of the hook.

Conventionally the acoustic liner is secured within the fan casing by fasteners, nuts and bolts or screws, or by adhesive bonding.

However, the fasteners extend radially through reinforced regions of the acoustic liner and these reinforced regions reduce the acoustic liner face area, which reduces the effectiveness to absorb noise, or attenuate sound, and the fasteners produce steps and gaps which affect the aerodynamic flow over the acoustic liner. In one known arrangement the acoustic liner comprises reinforced regions which include a number of honeycomb cells filled with a strong material and an aperture is machined through the reinforced region for a fastener to pass through. Alternatively the acoustic liner comprises a reinforced region, which includes a boss provided in a honeycomb cell and the boss has an aperture for a fastener to pass through as disclosed in our published UK patent application GB2319589A.

The use of adhesive bonding may be used to secure the acoustic liner to the fan casing, but subsequent replacement would be difficult and any damage to the acoustic liner would require repair using filler and this would also interfere with the ability of the fan casing to contain a detached fan blade.

Ideally the acoustic liner would be easy to install and remove or replace.

A fan blade track liner is provided within the fan casing around and adjacent the tips of the fan blades.

Conventionally the fan blade track liner is secured within the fan casing by adhesive bonding.

However, if the fan blade track liner becomes damaged subsequent removal and replacement is difficult and time consuming. Furthermore, during the removal of a damaged fan blade track liner there is a risk of damaging the fan casing and reducing the ability of the fan casing to contain a detached fan blade. It is possible to increase the thickness of the fan casing to allow for possible fan casing damage, however this adds weight to the gas turbine engine.

Ideally the fan blade track liner would be easy to install and remove or replace.

Accordingly the present invention seeks to provide a novel liner for a gas turbine engine casing, which overcomes the above-mentioned problems.

SUMMARY OF THE INVENTION

Accordingly the present invention provides a gas turbine engine casing comprising a generally cylindrical, or frusto-conical, casing, the casing including at least one member, the member having a first portion extending radially from the casing and a second portion extending axially from the first portion of the member, at least one liner panel being positioned radially from the casing, a first end of the liner panel having at least one axially extending member locatable on the second portion of the member, a second end of the liner panel having at least one axially extending member removably securable to the casing.

The axially extending member at the second end of the liner panel may be locatable on at least one bracket removably securable to the casing. The at least one bracket may be at least one L-shaped bracket removably securable to the casing.

The casing may include a flange at a first end of the casing, the flange extending radially from the casing and the at least one L-shaped bracket being removably securable to the flange.

Preferably the member is an annular member.

Preferably the L-shaped bracket having a first portion extending radially from the casing and a second portion extending axially from the first portion of the bracket.

The bracket may be an annular member.

Preferably there are a plurality of L-shaped brackets.

Preferably the axially extending member extends the full length of the first end of the liner panel. Alternatively there may be a plurality of axially extending members spaced apart on the first end of the liner panel.

Preferably the axially extending member extends the full length of the second end of the liner panel. Alternatively there may be a plurality of axially extending members spaced apart on the second end of the liner panel.

Preferably the flange has at least one recess, the at least one L-shaped bracket locating in the at least one recess in the flange.

Preferably there are a plurality of liner panels arranged circumferentially within or around the casing, a first end of each liner panel being removably securable on an annular member by at least one axially extending member, the at least one axially extending member of each liner panel locates on the second portion of the annular member and a second end of each liner panel being removably securable on at least one L-shaped bracket.

Preferably a resilient member is positioned between the at least one axially extending member on the first end of the liner panel and the second portion of the member. Preferably the resilient member is annular.

Preferably a resilient member is positioned between the at least one axially extending member on the second end of the liner panel and the L-shaped bracket.

Preferably the resilient member comprises rubber or silicone.

The axially extending member at the second end of the liner panel may be removably securable to the casing by at least one bolt or screw.

The bolt or screw may extend radially.

One or more liner panels may be arranged in a cassette, a first end of the cassette having at least one axially extending member locatable on the second portion of the member, a second end of the cassette having at least one axially extending member removably securable to the casing. Each liner panel may be adhesively bonded to the cassette. The cassette may comprise a composite material. The cassette may comprise graphite reinforced plastic. A compliant layer may be provided between the cassette and the casing. The compliant layer may comprise polysulphide.

The liner panel may be an acoustic panel or a rotor blade track panel.

Preferably each acoustic panel comprises a perforated skin and a structure to form an acoustic treatment structure.

Preferably the casing is a fan casing. Alternatively the casing may be a turbine casing.

Preferably the casing is formed from a metal. The casing may be formed from titanium, an alloy of titanium, aluminium, an alloy of aluminium or steel. Alternatively the casing may be formed from a composite material or other suitable material.

BRIEF DESCRIPTION OF THE DRAWINGS

The present invention will be more fully described by way of example with reference to the accompanying drawings in which:—

FIG. 3 is a further enlarged cross-sectional view of the fan casing shown in FIG. 2.

FIG. 4 is an enlarged cross-sectional view of an acoustic panel shown in FIG. 3.

FIG. 5 is a perspective view of a bracket shown in FIG. 4.

DETAILED DESCRIPTION OF THE INVENTION

Figure 1:
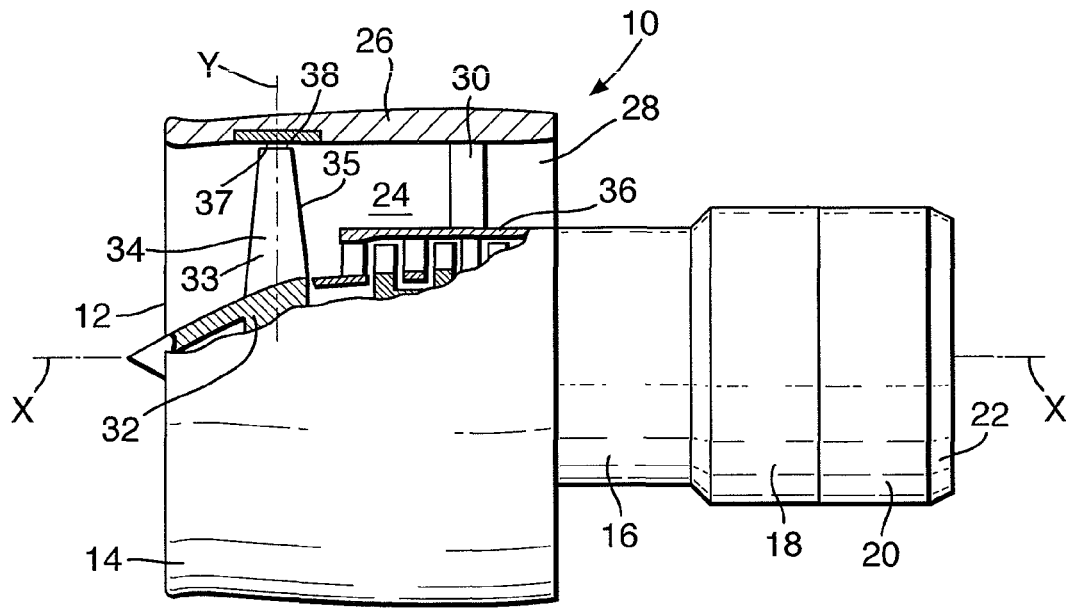
FIG. 1 is a partially cut away view of a gas turbine engine having a fan casing according to the present invention.
Figure 2:
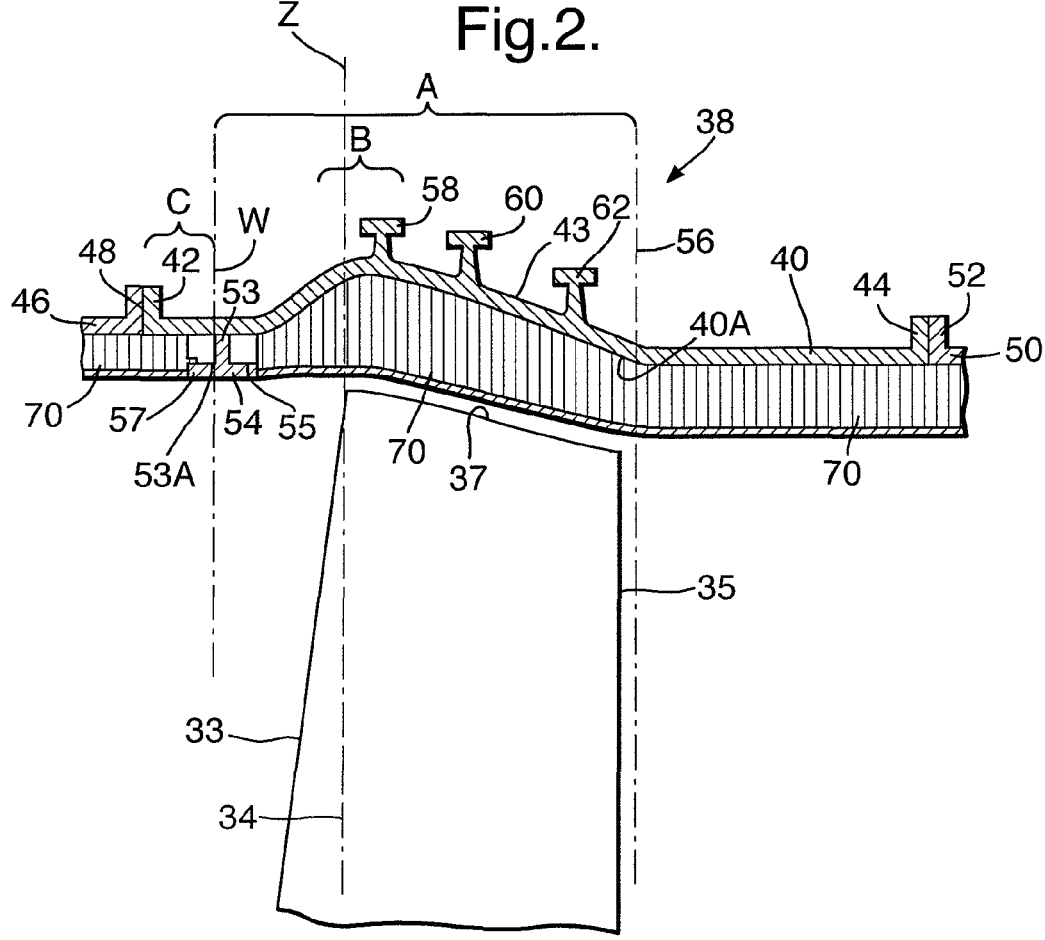
FIG. 2 is an enlarged cross-sectional view of the fan casing shown in FIG. 1.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing 26 surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane Y of the fan blades 34. The fan blades 34 have a leading edge 33, a trailing edge 35 and a tip 37.

The fan casing 26 and fan blade containment assembly 38 is shown more clearly in FIGS. 2, 3, 4, 5 and 6. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 comprises a downstream flange 44 by which the fan blade containment assembly 38 is connected to a flange 52 on a rear portion 50 of the fan casing 26. The metal casing 40 comprises an annular T-shaped member, or hook, 54 positioned axially upstream of the leading edge 33 of the tip 37 of the fan blade 34. The annular member 54 comprises a first portion 53 which extends in a radially inwardly direction from the metal casing 40, a second portion 55 which extends in an axially downstream direction from the radially inner end 53A of the first portion 53 of the annular member 54 towards the tip 37 of the fan blade 34 and a third portion 57 which extends in an axially upstream direction from the radially inner end 53A of the first portion 53 of the annular member 54 towards the intake assembly 46. The annular member 54 is substantially in a plane W, perpendicular to the axis X of the gas turbine engine 10, upstream of the most upstream point of the leading edge 33 of the fan blades 34.

The metal casing 40 has a containment portion A downstream of the annular member 54 and upstream of a plane 56, perpendicular to the axis X of the gas turbine engine 10, passing through the metal casing 40 and containing, or downstream of, the trailing edge 35 of the fan blades 34. The metal casing 40 has an upstream portion C that is upstream of the plane W. The containment portion A has a greater diameter than the diameter of the metal casing 40 at the annular member 54 and the upstream portion C of the metal casing 40. The containment portion A has a zone B substantially in a plane Z, perpendicular to the axis X of the gas turbine engine 10, containing the leading edge 33 of the tip 37 of the fan blade 34. The containment portion A of the metal casing 40 reaches a maximum diameter in the zone B. The containment portion A comprises one or more curved lines in axial cross-section, one or more straight lines in axial cross-section or at least one curved line and at least one straight line in axial cross-section to interconnect the annular member 54 and the plane 56 of the metal casing 40 to form a substantially radially outwardly dished shaped in the metal casing 40. The containment portion A progressively increases in diameter from the annular member 54 and the plane 56 to the maximum diameter in zone B.

The containment portion A of the metal casing 40 is thicker than the remainder of the metal casing 40. The containment portion A comprises a plurality of circumferentially extending ribs 58, 60 and 62. The ribs 58, 60 and 62 are T-shaped in axial cross-section. The rib 58 is arranged substantially in, or adjacent, the plane Z containing the leading edge 33 of the tip 37 of the fan blade 34. The rib 60 is arranged substantially in a plane containing the mid-chord of the fan blade 34 and the rib 62 is arranged substantially in a plane upstream of the trailing edge 35 of the fan blade 34.

It may be desirable in some circumstances to provide a number of continuous layers of a strong fibrous material wound around the thin corrugated metal casing 40 to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material.

A liner 70 is provided radially within the metal casing 40 and there are two types of liner 70: an acoustic liner 72 to reduce noise and a fan blade track panel 71 arranged around the fan blades 34 to form an abradable seal, as shown in FIG. 3.

The acoustic liner 72 generally comprises a plurality of acoustic panels 72, which are arranged circumferentially and axially along the inner surface 40A of the metal casing 40. Each acoustic panel 72 comprises a perforated skin 74 and a structure 76 to form an acoustic treatment structure. The perforated skin 74 has a plurality of perforations 78. The perforated skin 74 defines the flow path through the fan duct 24.

The perforated skin 74 of each acoustic panel 72 comprises aluminium, titanium or composite material, for example fibre reinforced plastic e.g. glass fibre reinforced epoxy resin. The structure 76 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced epoxy resin.

The fan blade track panel 71 generally comprises a plurality of fan blade track panels 71 which are arranged circumferentially and axially along the inner surface 40A of the metal casing 40. Each fan blade track panel 71 comprises a skin 74 and a structure 76 to form an abradable structure. The skin 74 defines the flow path through the fan duct 24.

The skin 74 of each fan blade track panel 71 comprises a composite material, for example fibre reinforced plastic e.g. glass fibre reinforced epoxy resin. The structure 76 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced epoxy resin. There may be an abradable material on the skin 74.

Figure 6:
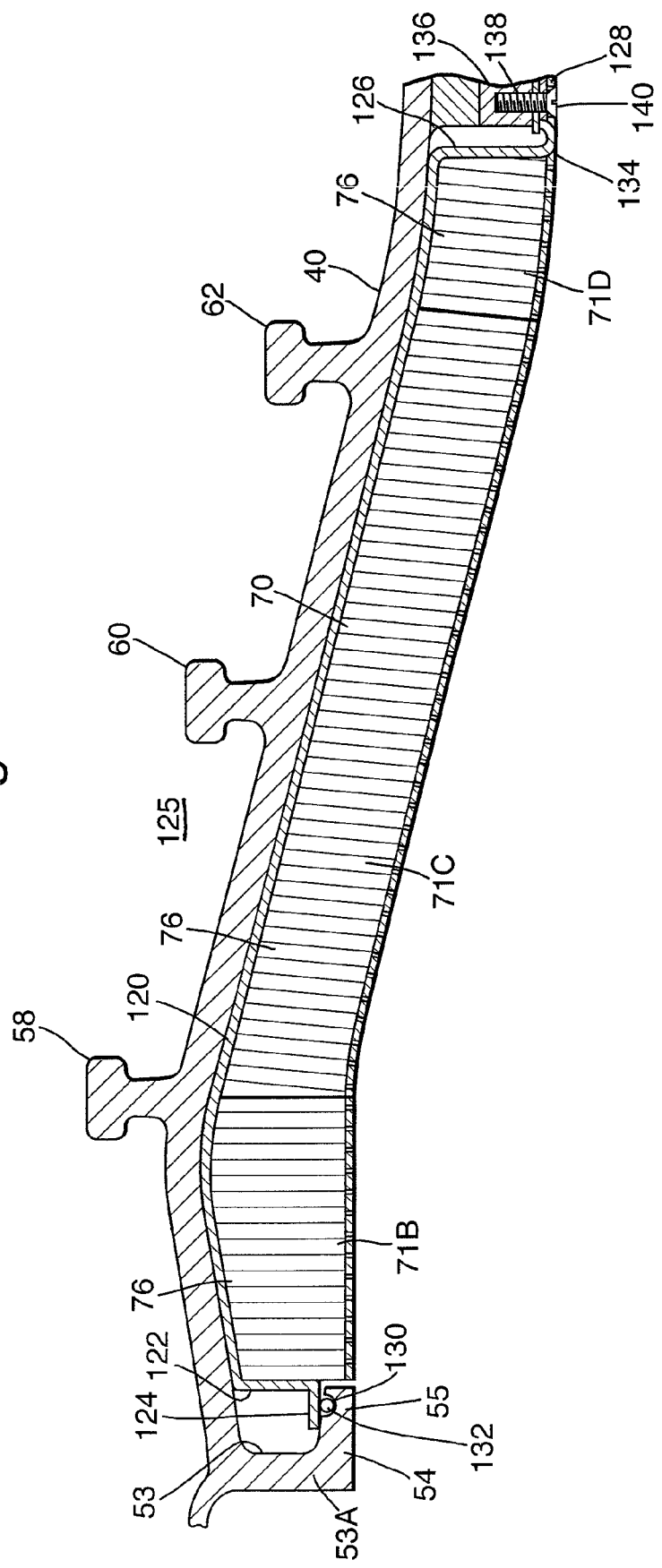
FIG. 6 is an enlarged cross-sectional view of a fan blade track panel shown in FIG. 3.

The panels of the liner 70 are secured to the metal casing 40 by various means. A circumferentially arranged set of acoustic panels 72A is arranged upstream of the plane W and the annular member 54 within the casing portion C. A circumferentially arranged set of fan blade track panels 71B is arranged axially between the tips 37 of the fan blades 34 and the annular member 54 within the metal casing 40. A further circumferentially arranged set of fan blade track panels 71C is arranged around the tips 37 of the fan blades 34 and another circumferentially arranged set of fan blade track panels 71D, shown in FIG. 6, is arranged downstream of the fan blades 34.

The acoustic panels 72A are secured to the metal casing 40 by an axially extending member 80 on the axially downstream end 82 of each acoustic panel 72A and an axially extending member 84 on the axially upstream end 86 of each acoustic panel 72A, as shown more clearly in FIGS. 4 and 5. The axially extending members 80 extend in an axially downstream direction radially outward of the axially extending third portion 57 of the annular member 54 and thus secure the downstream ends 82 of the acoustic panels 72A. An annular resilient sealing member, for example a rubber, or silicone, sealing member, 92 is located in an annular groove 90 on the radially outer surface 88 of the third portion 57 of the annular member 54. The annular resilient sealing member 92 thus biases the axially extending members 80 and the axially downstream ends 82 of the acoustic panels 72A radially outwardly into contact with the inner surface of the casing 40.

The flange 42 of the casing 40 has a plurality of circumferentially spaced recesses 94 on the face arranged to abut the flange 48 of the intake assembly 46. A plurality of L-shaped brackets 96 are provided and each L-shaped bracket 96 fits in one of the recesses 94 on the face of the flange 42 and each L-shaped bracket 96 is arranged flush with the face of the flange 42. Each L-shaped bracket 96 comprises a radially extending portion 98 and an axially extending portion 100. The axially extending portion 100 extends in an axially downstream direction and the axially extending members 84 extend in an axially upstream direction radially outwardly of the axially extending portions 100 of the L-shaped brackets 96 to secure the upstream ends 86 of the acoustic panels 72A.

Each L-shaped bracket 96 has a resilient member 102 located on the radially outer surface of the axially extending portion 100 of the L-shaped bracket 96. The resilient members 102 thus bias the axially extending members 84 and the axially upstream ends 86 of the acoustic panels 72A radially outwardly into contact with the inner surface of the casing 40. The radially extending portion 98 of each L-shaped bracket 96 has a countersunk aperture 104 arranged coaxially with one of a plurality of circumferentially arranged apertures 106 in the flange 42 of the casing. The L-shaped brackets 96 are secured to the flange 42 of the casing 40 by countersunk headed bolts, or screws, 108 passing through the apertures 104 and 106 in the L-shaped brackets 96 and flange 42 and respective nuts 110.

The acoustic panels 72A are installed by moving them in an axially downstream direction so that the axially extending members 80 locate on the radially outer surface 88 of the third portion 57 of the annular member 54. The L-shaped brackets 96 are located in the recesses 94 in the surface of the flange 42 and the axially extending portions 100 are positioned radially inwardly of the axially extending members 84 so that the axially extending members 84 locate on the axially extending portions 100 of the L-shaped brackets 96. The bolts, or screws, 108 are inserted through the apertures 104 and 106 in the L-shaped brackets 96 and flange 42 and threaded into the nuts 110.

The acoustic panels 72A are removed by unthreading the bolts, or screws, 108 from the nuts 110, removing the bolts 108 from the apertures 104 and 106 and removing the L-shaped brackets 96 from the recesses 94 in the flange 42. The acoustic panels 72A are removed by moving them in an axially upstream direction so that the axially extending members 80 no longer locate on the radially outer surface 88 of the third portion 57 of the annular member 54.

Preferably the L-shaped brackets 96 comprise a suitable metal or other suitable material. Other suitable shapes of bracket may be used.

Each acoustic panel 72A may be secured at its axially upstream end 86 by a single L-shaped bracket 96, which extends through a substantial portion, or the full length, of the axially upstream end 86 of each acoustic panel 72A respectively. Alternatively each acoustic panel 72A may be secured at its axially upstream end 86 by a plurality of L-shaped brackets 96 which are spaced apart along the length of the axially upstream end 86 of each acoustic panel 72A respectively.

The advantage of this embodiment of the present invention is that it allows the acoustic liners to be easily installed, inserted, and removed from the casing. Additionally, fasteners are not required to secure the acoustic liners to the casing and thus there is an increased acoustic liner face area, which increases the effectiveness to absorb noise, or attenuate sound, and there are no steps and gaps to affect the aerodynamic flow over the acoustic liner.

The fan blade track panels 71B, the fan blade track panels 71C and the fan blade track panels 71D are secured to a plurality of cassettes 120 by adhesive bonding, for example each cassette 120 has one acoustic panel 71B, one fan blade track panel 71C and one fan blade track panel 71D, as shown more clearly in FIG. 6. Each cassette 120 is an open ended box structure and comprises an upstream end 122, a downstream end 126, two sides (not shown) extending between and secured to the upstream end 122 and the downstream end 126 and a base portion 125 secured to the ends 122 and 126 and the sides. The fan blade track panels 71B, 71C and 71D are adhesively bonded at least to the base portion 125 of the cassette 120.

An axially extending member 124 on the axially upstream end 122 of each cassette 120 and an axially extending member 128 on the axially downstream end 126 of each cassette 120 secure the cassettes 120 to the fan casing 40. The axially extending members 124 extend in an axially upstream direction radially outward of the axially extending second portion 55 of the annular member 54 and thus secure the upstream ends 122 of the cassettes 120 to the casing 40. An annular resilient sealing member, for example a rubber, or silicone, sealing member, 132 is located in an annular groove 130 on the radially outer surface 89 of the second portion 55 of the annular member 54. The annular resilient sealing member 132 thus biases the axially extending members 124 and the axially upstream ends 122 of the cassettes 120 radially outwardly into contact with the inner surface of the casing 40.

The casing 40 has a plurality of circumferentially spaced inserts 136 extending radially inwardly from the inner surface of the casing 40 and the inserts 136 have threaded apertures 138. The axially extending members 128 extend in an axially downstream direction and the axially extending members 128 extend in an axially downstream direction radially inwardly of the inserts 136. Each axially extending member 128 has one or more countersunk apertures 134 arranged coaxially with the apertures 138 and countersunk bolts, or screws, are inserted through the apertures 134 and are threaded into the threaded apertures 138 to secure the downstream end 126 of the cassette 120 to the casing 40. The axially extending member 128 is made sufficiently thick to withstand ice impact damage.

The cassettes 120 comprises a composite material, for example graphite reinforced plastic and a compliant layer, for example polysulphide, may be provided between the cassettes 120 and the casing 40 to reduce fretting between the cassettes 120 and the casing 40.

The fan blade track panels 71B, the fan blade track panels 71C and the fan blade track panels 71D are installed by firstly adhesively bonding to a cassette 120. The cassettes 120 are installed by moving them in an axially upstream direction so that the axially extending members 124 locate on the radially outer surface 89 of the second portion 55 of the annular member 54. Then the axially extending members 128 are located on the inserts 136. The bolts, or screws, 140 are inserted through the apertures 134 and 138 in the axially extending members 128 of the cassettes 120 and inserts 136 and threaded into the apertures 138.

The fan blade track panels 71B, fan blade track panels 71C and fan blade track panels 71D are removed by unthreading the bolts, or screws, 140 from the threaded apertures 138 and removing the bolts 140 from the apertures 134 and 138. The cassettes 120 are removed by moving them in an axially downstream direction so that the axially extending members 124 no longer locate on the radially outer surface 89 of the second portion 55 of the annular member 54. If one or more of the fan blade track panels 71B, 71C and 71D are damaged a new cassette 120 with fan blade track panels 71B, 71C and 71D adhesively bonded to the cassette 120 is installed.

Additional anti-rotation features are provided to prevent rotation of the cassettes 120 relative to the casing 40 in the event of the tips of the fan blades 34 rubbing excessively on the fan blade track panels 71C and 71D.

The advantages of this embodiment of the present invention are that it removes the requirement to adhesively bond the liners to the fan casing, it eliminates the risk of damaging the fan casing during removal of a damaged liner and hence the risk of reducing the fan blade containment capability of the fan casing. It is possible to replace a damaged liner much more quickly. It is not necessary to increase the thickness of the fan casing to allow for possible damage to the fan casing.

The metal casing may be manufactured from titanium, titanium alloy, aluminium, aluminium alloy, nickel, nickel alloy and steel. Alternatively the casing may be manufactured from a composite material or other suitable material.

The present invention has been described with reference to a fan casing, however it is equally applicable to a compressor casing and a turbine casing.

Although the present invention has been described with reference to the use of an annular member with an axially extending portion to retain the axially downstream ends of the set of acoustic panels it may be possible to arrange for an annular member with an axially extending member to retain the axially upstream end of the set of acoustic panels.

Although the present invention has been described with reference to the use of brackets to support one axial end of the acoustic liners it may be possible to use other suitable means for example radial fasteners, nuts and bolts although this may reduce the benefits of the present invention.

The present invention has described the annular member as being T-shaped in cross-section, the annular member may be T-shaped in cross-section in order to support acoustic panels axially upstream and axially downstream of the annular member or the annular member may be L-shaped in cross-section to support acoustic panel panels either axially upstream or axially downstream of the annular member.

It may be possible to provide a plurality of circumferentially arranged members which have radially inwardly and axially extending portions to retain the liner panels rather than an annular member.

It may be possible for a cassette to carry one or more acoustic panels or one or more fan blade track panels.

We claim:

1. A gas turbine engine casing comprising:
   a generally cylindrical, or frustoconical, casing;
   at least one member, the at least one member having a first portion extending radially from the casing and a second portion extending axially from the first portion of the member; and
   at least one liner panel being positioned radially from the casing, the liner panel having a first end and a second end, the first end of the liner panel having at least one axially extending member locatable on the second portion of the member, the second end of the liner panel having at least one axially extending member removably securable to the casing, wherein a resilient member is positioned between the at least one axially extending member on the first end of the liner panel and the second portion of the member.

2. A gas turbine engine casing as claimed in claim 1 wherein the resilient member is annular.

3. A gas turbine engine casing as claimed in claim 1 wherein the resilient member is selected from the group comprising rubber and silicone.

4. A gas turbine engine casing comprising:
   a generally cylindrical, or frustoconical, casing;
   at least one member, the at least one member having a first portion extending radially from the casing and a second portion extending axially from the first portion of the member; and
   at least one liner panel being positioned radially from the casing, the liner panel having a first end and a second end, the first end of the liner panel having at least one axially extending member locatable on the second portion of the member, the second end of the liner panel having at least one axially extending member removably securable to the casing, wherein the at least one axially extending member at the second end of the liner panel is locatable on at least one bracket removably securable to the casing, and wherein the at least one bracket is at least one L-shaped bracket, and wherein a resilient member is positioned between the at least one axially extending member on the second end of the liner panel and the L-shaped bracket.

5. A gas turbine engine casing comprising:
a generally cylindrical, or frustoconical casing;
at least one member, the at least one member having a first portion extending radially from the casing and a second portion extending axially from the first portion of the member; and
at least one liner panel being arranged in a cassette, the cassette being positioned radially from the casing, the cassette having a first end and a second end, the first end of the cassette having at least one axially extending member locatable on the second portion of the member, the second end of the cassette having at least one axially extending member removably securable to the casing, wherein a resilient member is positioned between the at least one axially extending member on the first end of the cassette and the second portion of the member.

6. A gas turbine engine casing as claimed in claim 5 wherein each liner panel is adhesively bonded to the cassette.

7. A gas turbine engine casing as claimed in claim 5 wherein the cassette comprises a composite material.

8. A gas turbine engine casing as claimed in claim 7 wherein the cassette comprise graphite reinforced plastic.

9. A gas turbine engine casing as claimed in claim 5 wherein the liner panel is a rotor blade track panel.

10. A gas turbine engine casing as claimed in claim 5 wherein the casing is a fan casing.

11. A gas turbine engine casing as claimed in claim 5 wherein the casing is formed from a metal.

12. A gas turbine engine casing as claimed in claim 11 wherein the casing is formed from a metal selected from the group comprising titanium, an alloy of titanium, aluminium, an alloy of aluminium and steel.

13. A gas turbine engine casing as claimed in claim 5 wherein the member is an annular member.

14. A gas turbine engine casing as claimed in claim 5 wherein there are a plurality of cassettes arranged circumferentially within or around the casing, a first end of each cassette being removably securable on an annular member by at least one axially extending member, the at least one axially extending member of each cassette locates on the second portion of the annular member and a second end of each cassette being removably securable to the casing.

15. A gas turbine engine casing as claimed in claim 5 wherein the resilient member is annular.

16. A gas turbine engine casing as claimed in claim 15 wherein the resilient member comprises rubber or silicone.

17. A gas turbine engine casing as claimed in claim 5 wherein the liner panel is an acoustic panel.

18. A gas turbine engine casing as claimed in claim 17 wherein each acoustic panel comprises a perforated skin and a structure to form an acoustic treatment structure.

19. A gas turbine engine casing as claimed in claim 5 wherein each cassette comprises an open ended box structure and comprises an upstream end, a downstream end and sides extending between the upstream end and the downstream end and a base portion secured to the ends and the sides.

20. A gas turbine engine casing as claimed in claim 19 wherein the at least one liner panel is adhesively bonded at least to the base portion of the cassette.

21. A gas turbine engine casing comprising:
a generally cylindrical, or frustoconical casing;
at least one member, the at least one member having a first portion extending radially from the casing and a second portion extending axially from the first portion of the member; and
at least one liner panel being arranged in a cassette, the cassette having a first end and a second end, the first end of the cassette having at least one axially extending member locatable on the second portion of the member, the second end of the cassette having at least one axially extending member removably securable to the casing, wherein the axially extending member at the second end of the cassette is removably securable to the casing by at least one bolt or screw.

22. A gas turbine engine casing as claimed in claim 21 wherein the bolt or screw extends radially.

23. A gas turbine engine casing comprising:
a generally cylindrical, or frustoconical casing;
at least one member, the at least one member having a first portion extending radially from the casing and a second portion extending axially from the first portion of the member; and
at least one liner panel being arranged in a cassette, the cassette having a first end and a second end, the first end of the cassette having at least one axially extending member locatable on the second portion of the member, the second end of the cassette having at least one axially extending member removably securable to the casing, wherein a compliant layer is provided between the cassette and the casing.

24. A gas turbine engine casing as claimed in claim 23 wherein the compliant layer comprises polysulphide.

25. A gas turbine engine casing comprising:
a generally cylindrical, or frustoconical casing;
at least one member, the at least one member having a first portion extending radially from the casing and a second portion extending axially from the first portion of the member;
a flange at a first end of the casing, the flange extending radially from the casing;
at least one liner panel being positioned radially from the casing, the at least one liner panel having a first end and a second end, the first end of the liner panel having at least one axially extending member locatable on the second portion of the member, the second end of the liner panel having at least one axially extending member removably securable to the flange, the at least one liner panel having a skin defining a flowpath through a duct, a portion of the skin contacting and extending axially from the second end of the at least one liner panel, the at least one axially extending member at the second end of the at least one liner panel being located radially between the casing and the portion of the skin extending axially from the second end of the at least one liner panel; and
at least one bracket being removably securable to the flange, wherein the at least one axially extending member at the second end of the at least one liner panel is locatable on the at least one bracket, and wherein the at least one bracket is located radially outward of the portion of the skin extending axially from the second end of the at least one liner panel.

26. A gas turbine engine casing as claimed in claim 25 wherein the at least one bracket is at least one L-shaped bracket removably securable to the flange.

27. A gas turbine engine casing as claimed in claim 26 wherein the at least one L-shaped bracket comprises a first portion extending radially from the casing and a second portion extending axially from the first portion of the bracket.

28. A gas turbine engine casing as claimed in claim 26 wherein the bracket is an annular member.

29. A gas turbine engine casing as claimed in claim 26 wherein there are a plurality of L-shaped brackets.

30. A gas turbine engine casing as claimed in claim 26 wherein the flange has at least one recess, the at least one L-shaped bracket locating in the at least one recess in the flange.

31. A gas turbine engine casing as claimed in claim 30 wherein the at least one recess is arranged on a face of the flange, the face of the flange being arranged to abut a flange of an adjacent assembly.

32. A gas turbine engine casing as claimed in claim 31 wherein the adjacent assembly is an intake assembly.

33. A gas turbine engine casing as claimed in claim 25 wherein the at least one member is an annular member of the casing.

34. A gas turbine engine casing as claimed in claim 25 wherein the at least one liner panel has a single axially extending member, the axially extending member extending the full length of the first end of the liner panel.

35. A gas turbine engine casing as claimed in claim 25 wherein the at least one liner panel has a plurality of axially extending members spaced apart on the first end of the liner panel.

36. A gas turbine engine casing as claimed in claim 25 wherein the at least one liner panel has a single axially extending member, the axially extending member extending the full length of the second end of the liner panel.

37. A gas turbine engine casing as claimed in claim 25 wherein the at least one liner panel has a plurality of axially extending members spaced apart on the second end of the liner panel.

38. A gas turbine engine casing as claimed in claim 25 wherein there are a plurality of liner panels arranged circumferentially within or around the casing, a first end of each liner panel being removably securable on an annular member by at least one axially extending member, the at least one axially extending member of each liner panel locates on the second portion of the annular member and a second end of each liner panel being removably securable on at least one L-shaped bracket.

39. A gas turbine engine casing as claimed in claim 25 wherein the liner panel is an acoustic panel.

40. A gas turbine engine casing as claimed in claim 39 wherein each acoustic panel comprises a perforated skin and a structure to form an acoustic treatment structure.

41. A gas turbine engine casing as claimed in claim 25 wherein the casing is a fan casing.

42. A gas turbine engine casing as claimed in claim 25 wherein the casing is formed from a metal.

43. A gas turbine engine casing as claimed in claim 42 wherein the casing is formed from a metal selected from the group comprising titanium, an alloy of titanium, aluminium, an alloy of aluminium and steel.

44. A gas turbine engine casing as claimed in claim 25 wherein the flange has at least one recess, the at least one bracket locating in the at least one recess in the flange.

45. A gas turbine engine casing as claimed in claim 44 wherein the at least one recess is arranged on a face of the flange, the face of the flange being arranged to abut a flange of an adjacent assembly.

46. A gas turbine engine casing as claimed in claim 45 wherein the adjacent assembly is an intake assembly.

47. A gas turbine engine casing as claimed in claim 25 wherein the at least one member is a T-shaped member.

* * * * *